Nov. 24, 1925.

W. J. SPIRO 1,562,801

AUTOMOBILE CONTROL

Filed Aug. 12, 1924

Inventor
Walter J. Spiro

By Alfred I. Gage

Attorney

Nov. 24, 1925.  
W. J. SPIRO  
AUTOMOBILE CONTROL  
Filed Aug. 12, 1924  
1,562,801  
2 Sheets-Sheet 2
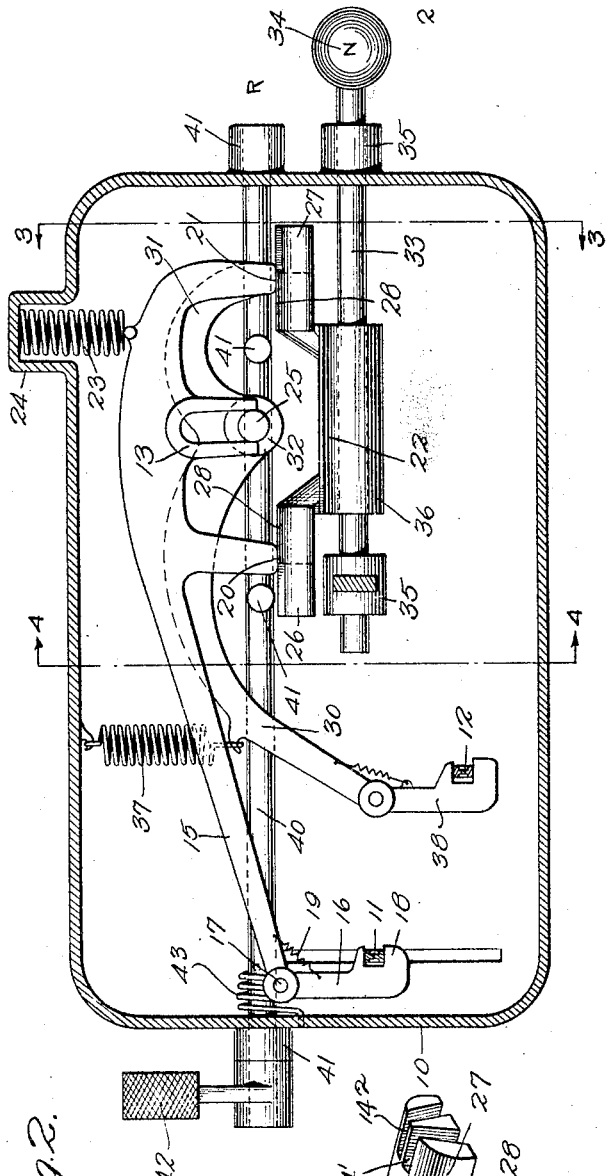

Patented Nov. 24, 1925.

1,562,801

UNITED STATES PATENT OFFICE.

WALTER J. SPIRO, OF WHITE PLAINS, NEW YORK.

AUTOMOBILE CONTROL.

Application filed August 12, 1924. Serial No. 731,574.

*To all whom it may concern:*

Be it known that I, WALTER J. SPIRO, a citizen of the United States, residing at White Plains, in the county of Westchester and State of New York, have invented certain new and useful Improvements in Automobile Controls, of which the following is a specification.

This invention relates to an automobile control and particularly to a construction designed to control by a hand shift lever the usual foot pedals for speed change and reverse in a clutch type of driving mechanism, such as used in the Ford automobile.

In previous constructions having this object in view changes were required in the normal control mechanism of the car, and the present invention comprises an attachment to such mechanism, obviating any changes therein, and capable of convenient application and removal so that the car may be driven by the ordinary foot control, or if the operator is more familiar with the universal gear shift lever, the application of the attachment permits the machine to be driven in substantially the same manner as a car having a shiftable gear driving mechanism. This permits a Ford car to be conveniently and safely driven by an operator who is accustomed to a hand lever control and is particularly desirable where cars of these different types are operated by the same person as it avoids frequent accidents due to a quick change from a hand to a pedal controlled mechanism.

The invention has for an object to provide an improved construction comprising spring actuated shifting levers for the speed change and reverse pedals controlled in their movement by a selector device operable by a hand lever mounted for actuation in substantially the same manner as the usual gear shift lever.

A further object of the invention is to provide a novel form of speed shift lever having a plurality of fulcrums which cooperate with a selector device in its different positions to permit movements of the lever in opposite directions under the influence of actuating springs properly disposed for that purpose.

Another object of the invention is to present an improved construction of attachment comprising a casing adapted to enclose the usual speed change and reverse pedals and provided with shifting levers attached to said pedals and controlling means for said levers operable by a hand device.

A still further object of the invention is to provide shifting levers for the speed change and reverse pedals with selecting means for controlling the movements of said pedals, and a pedal member adapted to restore said levers to a neutral position before operation of the selective means.

Other and further objects and advantages of the invention will be hereinafter set forth and the novel features thereof set forth in the appended claims.

In the drawings—

Figure 2 is a horizontal section therethrough;

Figure 3 is a section on line 3—3 of Figure 2;

Figure 6 is a perspective of the selector.

Like numerals refer to like parts in the several figures of the drawings.

Figure 1:
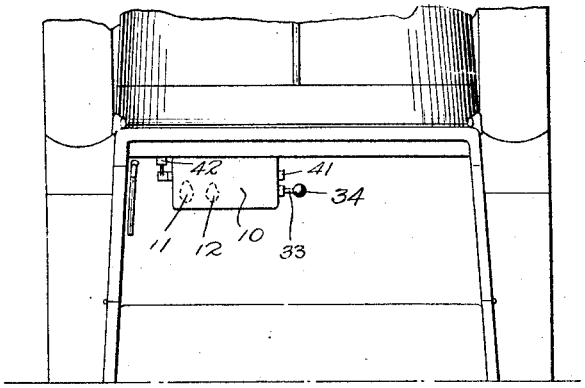
Figure 1 is a plan view of the control applied.

The invention may be embodied in various forms convenient for application to different types of automobiles, and in the form shown the casing 10 may be of any desired size or configuration adapted to enclose the usual speed change pedal 11 and reverse pedal 12 of a Ford clutch type of transmission.

Within the casing a speed shift lever 15 is disposed and suitably connected with the pedal 11, for instance, by a link 16 pivoted at one end 17 to the lever and formed at its opposite end with a fork 18 embracing the pedal and held in contact therewith by a spring 19 extending between the link and lever. The lever is provided with laterally extending fulcrum arms 20 and 21 which are supported by a selective device 22 when the parts are in neutral position. The lever is held under tension in such contact by an expansive spring pressure upon its end next the selector, a preferable form being the spring 23 located in the socket 24 of the casing and bearing upon the lever. The opposite end of the lever is under the influence of the usual controlling spring for the pedal 11 which retains it in high speed position.

The spring 23 being used to shift to low speed position must be of greater power than the normal spring upon the pedal. The shift lever is retained against longitudinal displacement by a slot 13 therein which embraces a bearing shaft or post 25 carried by the casing and permits a lateral movement of the lever as its fulcrum is changed and it swings in the action of the selector.

This selector 22 is formed at its opposite ends with heads 26 and 27, each being provided with a bearing face 28 upon which the fulcrum arms of the shift lever rest when in neutral position, as shown in Figure 2. The head 26 has a single aperture or opening 14 therethrough disposed to receive one fulcrum arm when the shift lever is pivoted upon the other fulcrum, and the head 27 is formed with two such apertures 14' and 14² one of which cooperates with a fulcrum of the shift lever and the other with a lateral arm 31 from the reverse lever 30 which is pivoted at 32 upon the bearing shaft 25. The contact faces of the heads 26 and 27 are curved as shown so as to ride upon the lever contacts until the latter enter the apertures therein, and the head 27 is of greater arcuate area than the head 26 to accommodate the two openings therein.

The selector device 22 is mounted upon a shaft 33 for oscillatory and reciprocatory movement and this shaft has at its outer end an angularly disposed hand lever 34 of any desired character, such as ordinarily used for gear shifting. The shaft 33 is mounted in bearings 35 and its inward sliding movement limited by a stop face 36 and its outward travel limited by contact of head 27 with the end of the casing.

The reverse lever 30 is located parallel to the speed shift lever and its arm tensioned into contact with the selector by a contractive spring 37 extending from the opposite end of the lever to the casing. This latter end of the reverse lever is connected to the usual reverse pedal 12 by a link 38 pivoted thereon and similar in construction and operation to the link 16 for the speed shift lever before described.

The casing is also provided with a shaft 40 mounted in bearings 41' therein and formed with rocker arms or pins 41 disposed to engage both the shift and reverse levers to restore them to neutral position when the pedal 42 on this shaft is depressed and thus permit the setting of the selector for subsequent operation. This pedal may be tensioned in its raised position by a spring 43, and in its relation to the operator is similar to the engine clutch pedal in a gear shift type of mechanism.

The general operation of the attachment will be apparent from the foregoing description and it will be seen that when the hand lever is in its upright or central position, at N Figure 2, the parts are in neutral position. If the hand lever is moved rearwardly to the left to position "1" Figure 5, the selector is shifted to bring the aperture 14' in its head 27 into alignment with the fulcrum arm 21 of the speed shift lever which passes therethrough as the lever is rocked upon its fulcrum 20 by the master spring 23 which overpowers the normal holding spring for the speed change pedal 11 and moves the same into position for first or low speed where it is retained, as shown by full lines in Figure 5. Under these conditions the spring 23 has the advantage of the greater leverage from the fulcrum to its point of application at the end of the shift lever.

Figure 5:
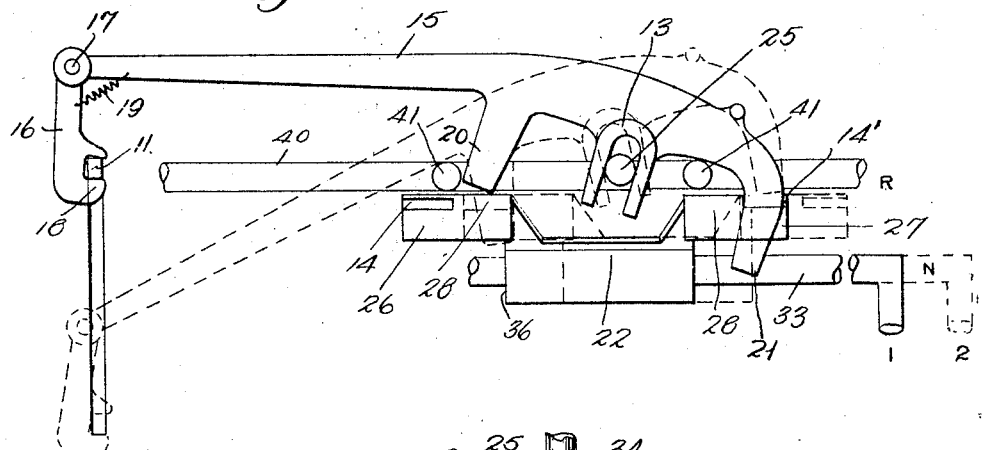
Figure 5 is a diagrammatic showing of the shifted positions of the speed change lever.
Figure 4:
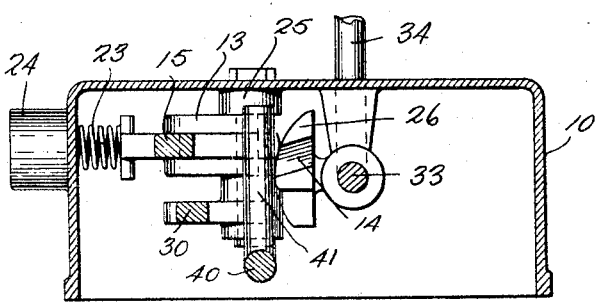
Figure 4 is a like view of line 4—4 of Figure 2.

When shifting to high speed, the clutch pedal is first depressed to restore the parts to neutral, and the hand lever then moved rearwardly to the right, at position "2" as shown in Figure 5 by dotted lines. This brings the opening 14 in selector head 26 into alignment with the fulcrum 20 of the speed shift lever which passes therethrough as it is pivoted upon its arm 21 resting upon the supporting face 28 of the head 27. In this position the speed shift lever is actuated and held by the normal holding spring of the speed shift pedal in high speed position.

To reverse the drive, the levers are restored to neutral and the hand lever rocked forwardly and to the left to position R, Figures 2 and 5, which brings the aperture 14² into line with the arm 31 of the reverse lever to permit movement of the latter under tension of the spring 37 to shift the reverse pedal in the proper direction.

The invention thus presents an assemblage of parts closely simulating those upon an ordinary gear shift type of machine and renders it simple and easy for the operator of such a machine to control one of the clutch drive type by the addition of an attachment of this character. The invention has been described as an attachment but it will be understood that the control mechanism may be built into the machine as a part thereof and the shifting positions changed as found most convenient.

The attachment can be readily removed if it be desired to use the machine in the ordinary manner. The shifting is entirely effected by spring action and the only power necessary at the hand lever is that to actuate the selector, while the power for restoring the levers to neutral against the spring tension is applied by the clutch pedal carried by the casing. This means for shifting effects a rapid movement of the pedals and retains them in shifted position thus avoiding the necessity of holding the pedal at first speed which is particularly convenient when ascending a grade. The arrangement also permits either the first or second speed gears to be left engaged while the car is standing, thus acting as an additional brake when the motor is not running.

While the specific details of the construction have been shown and described, still the invention is not confined thereto, as changes and alterations may be made without departing from the spirit of the invention as defined by the following claims.

What I claim is—

1. In an automobile control, the combination of a speed change lever, a shift lever connected thereto, means for applying a stored energy for automatically actuating the shift lever in opposite directions, and a selector disposed to control the movement of said shift lever.

2. In an automobile control, the combination of a speed change lever, a shift lever connected thereto, means for applying a stored energy for automatically actuating the shift lever in opposite directions, a selector disposed to control the movements of said shift lever, and a hand operated lever for said selector.

3. In an automobile control, the combination of a speed change lever, a shift lever connected thereto, means for applying a stored energy for automatically actuating the shift lever in opposite directions, a selector disposed to control the movements of said shift lever, and a pedal operated member for neutralizing said shift lever.

4. In an automobile control, the combination of a speed change lever and a reverse lever, independent shift levers connected to each thereof, means for applying a stored energy for automatically actuating said shift levers, and a hand operated selector disposed to control the movements of said levers.

5. In an automobile control, the combination of a speed change lever and a reverse lever, independent shift levers connected to each thereof, means for applying a stored energy for automatically actuating said shift levers, a hand operated selector disposed to control the movements of said shift levers, and a pedal operated neutralizer cooperating with said shift levers.

6. In an automobile control attachment, a casing carrying shift levers adapted for connection with speed change and reverse pedals, means for applying a stored energy for automatically actuating said lever, a selector disposed to control the operation of said shift levers, and hand operated means for moving said selector.

7. An automobile control attachment comprising a casing carrying shift levers adapted for connection with speed change and reverse levers, a selector disposed to control the operation of said shift levers, hand operated means for moving said selector, and a pedal operated neutralizer mounted in the casing to cooperate with said shift levers.

8. An automobile control attachment comprising a casing carrying a shift lever means for applying a stored energy for automatically shifting said lever, in opposite directions, a selector disposed to control the movements of said lever, and hand operated means for shifting said selector to permit opposite movements of the shift lever.

9. An automobile control attachment for speed change and reverse pedals comprising a casing carrying shift levers adapted for connection to said pedals, means for applying a stored energy for automatically shifting said levers, a selector disposed to control the movements of said levers, a hand lever for operating said selector, and means for neutralizing said shift levers.

10. An automobile control attachment for speed change and reverse pedals comprising a casing carrying independent shift levers adapted for connection to said pedals, springs for moving said levers into operative position, a selector disposed to resist the action of said springs, and means for actuating the selector to permit such action.

11. In an automobile control, a shift lever adapted for connection to a speed change lever and having a plurality of fulcrums, and a selector provided with surfaces to support said fulcrums and shiftable to permit a movement of either fulcrum so that the shift lever will pivot upon the remaining fulcrum.

12. In an automobile control, a shift lever adapted for connection to a speed change lever and having two lateral fulcrum arms, means for automatically moving the shift lever in opposite directions, and a selector provided with surfaces to support said fulcrums and apertures to permit the passage of either fulcrum therethrough in the shifting movement of the selector.

13. In an automobile control, a shift lever adapted for connection at one end to a speed change lever and having at its opposite end two lateral fulcrum arms, an apertured selector disposed to cooperate with said arms, and a tension spring connected to the lever for retaining said arms in contact with the selector.

14. In an automobile control, independent shift levers adapted for connection at one end to speed change and reverse levers and provided at their opposite ends with contact arms, an apertured selector cooperating with said arms, means for tensioning the arms toward said selector, and means for imparting an oscillatory and reciprocatory movement to said selector.

15. In an automobile control, independent shift levers adapted for connection at one end to speed change and reverse levers and provided at their opposite ends with contact arms, a selector cooperating with said arms to prevent movement thereof, means for tensioning the arms toward said selector, means for imparting movement to said selector to permit travel of said arms, and a pedal actuated neutralizing shaft provided with means to engage and restore said shift levers.

16. In an automobile control, a plurality of shift levers, means for applying a stored energy for automatically moving the same, a selector for resisting movement of said levers comprising opposite heads having a supporting surface to contact therewith and apertures to permit shifting movement of said levers, and a hand operated lever for actuating said selector.

17. In an automobile control, a plurality of shift levers, means for automatically moving the same, a selector for resisting movement of said levers comprising opposite heads having a supporting surface to contact therewith and apertures to permit shifting movement of the levers, a shaft for said selector mounted for oscillatory and reciprocatory movement, and a hand lever for actuating said shaft.

18. In an automobile control, a casing, a supporting post, a shift lever provided at one end with lateral fulcrum arms and an intermediate slot seated upon said post for lateral movement, a selector cooperating with said fulcrum arms to support or release the same, and means for tensioning said arms toward said selector.

19. In an automobile control, a casing, a supporting post, a shift lever provided at one end with lateral fulcrum arms and a slot disposed for lateral movement upon said post, a separate shift lever pivoted on said post and formed with a contact arm, a selector cooperating with said fulcrum and contact arms to support or release the same, and means for tensioning said arms toward said selector.

20. In an automobile control, a casing, a supporting post, a shift lever provided at one end with lateral fulcrum arms and mounted for transverse movement upon said post, a separate shift lever pivoted on said post and formed with a contact arm, a selector cooperating with said fulcrum and contact arms to support or release the same, means for tensioning said arms toward said selector, and a neutralizing shaft mounted in said casing and formed with means to engage and restore said levers.

21. In an automobile control, a shift lever provided at one end with a pivoted link adapted to engage a pedal member, a spring extending from said link to said lever for retaining the link in such engagement, and means for controlling the movement of the opposite end of said shift lever.

22. An automobile control comprising shift levers adapted for connection to pedal members, means for applying a stored energy for automatically actuating such levers, hand means for controlling such actuation, and foot means for restoring the levers to neutral.

23. In an automobile control, a casing, a shift lever mounted therein, means for actuating and controlling the shifting movement of said lever, a shaft mounted in said casing and provided with a pedal member, and a rocker pin carried by said shaft to engage and restore said shift lever to neutral position.

24. In an automobile control, a shift lever connected to a speed change pedal, means for controlling the movements of said lever in opposite directions, and a tension spring acting upon said lever of greater power than the normal high speed spring of the change pedal and disposed to retain the latter in low speed position.

25. In an automobile control, a shift lever having a contact face, a selector comprising a body formed at each end with contact heads with lever supporting faces and means to permit movement of the lever, a rod mounted for oscillatory and reciprocatory movements and connected to said body, and an operating handle extending at substantially a right angle to said rod.

In testimony whereof I affix my signature.

WALTER J. SPIRO.